(12) United States Patent
Björnsson et al.

(10) Patent No.: US 12,172,569 B2
(45) Date of Patent: Dec. 24, 2024

(54) SUSPENSION ASSEMBLY FOR SUPPORTING A VIBRATION SENSITIVE DEVICE

(71) Applicant: SAAB AB, Linköping (SE)

(72) Inventors: Jonas Björnsson, Karlstad (SE); Urban Bruzén, Karlstad (SE); Sven Komstadius, Linköping (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 17/756,389

(22) PCT Filed: Dec. 19, 2019

(86) PCT No.: PCT/SE2019/051326
§ 371 (c)(1),
(2) Date: May 24, 2022

(87) PCT Pub. No.: WO2021/126031
PCT Pub. Date: Jun. 24, 2021

(65) Prior Publication Data
US 2023/0024078 A1    Jan. 26, 2023

(51) Int. Cl.
*B60P 7/16* (2006.01)
*F16F 15/08* (2006.01)
*F16M 11/22* (2006.01)

(52) U.S. Cl.
CPC .......... *B60P 7/16* (2013.01); *F16F 15/085* (2013.01); *F16M 11/22* (2013.01); *F16F 2230/007* (2013.01)

(58) Field of Classification Search
CPC .. F16F 15/02; F16F 15/085; F16F 7/14; F16F 2230/007; F16F 15/04; F16F 15/08; F16F 15/021; F16M 11/22; B60P 7/16
(Continued)

(56) References Cited

U.S. PATENT DOCUMENTS 4,093,072 A * 6/1978 Black, Jr. .......... F16M 7/00
                                              206/521
6,550,741 B1 * 4/2003 Cottone ............ B61D 45/003
                                              108/51.11
(Continued)

FOREIGN PATENT DOCUMENTS

CN    101251165 A  *  8/2008
CN    202381614 U  *  8/2012
(Continued)

OTHER PUBLICATIONS

CN-101251165-A translation, Hu N, Aug. 2008 (Year: 2008).*
(Continued)

*Primary Examiner* — Nathan J Newhouse
*Assistant Examiner* — Matthew T Theis
(74) *Attorney, Agent, or Firm* — Alston & Bird LLP (57) ABSTRACT

The invention relates to a suspension assembly (10, 10a, 10b) for supporting a vibration sensitive device (1) in relation to a base (100). The suspension assembly (10, 10a, 10b) comprises: a support arrangement (20) comprising a support plate (21) and a damping support member (22). The support member (22) is configured to receive the vibration sensitive device (1) and the support plate (21) comprises a centre portion (23) and at least two side portions (24) extending with an inclination angle (α) outwardly from the centre portion (23), a base arrangement (30) comprising at least two inclined portions (34) extending essentially in parallel with the at least two side portions (24) of the support plate (21); and at least two wire rope isolators (40), each arranged between a side portion (24) of the support plate (21) and an inclined portion (34) of the base arrangement (30). The invention also relates to a suspension system (80), a vehicle (101), a use of such a suspension assembly (10,
(Continued)

10a, 10b) for supporting a weapon and damping vibrations during transportation.

13 Claims, 7 Drawing Sheets

(58) Field of Classification Search
USPC .................................................. 224/42.32
See application file for complete search history.

(56) References Cited

U.S. PATENT DOCUMENTS

| | | | |
|---|---|---|---|
| 2002/0158181 A1 | | 10/2002 | Carter et al. |
| 2014/0061422 A1 | | 3/2014 | Monteil et al. |

FOREIGN PATENT DOCUMENTS

| | | | | |
|---|---|---|---|---|
| CN | 102720789 | A | | 10/2012 |
| CN | 202674153 | U | * | 1/2013 |
| CN | 103363011 | A | * | 10/2013 |
| CN | 102410329 | B | | 4/2014 |
| CN | 204878518 | U | * | 12/2015 |
| CN | 105351441 | A | | 2/2016 |
| CN | 209539911 | U | | 10/2019 |
| DE | 102012204059 | B3 | | 6/2013 |
| EP | 0553633 | A1 | | 8/1993 |
| JP | 2003-056616 | A | | 2/2003 |
| JP | 2009-138844 | A | | 6/2009 |
| RS | 20060579 | A | | 7/2009 |
| WO | WO 2005/088338 | A2 | | 9/2005 |
| WO | WO-2012152826 | A1 | * | 11/2012 ............... B63G 3/04 |
| WO | WO 2014/172934 | A1 | | 10/2014 |

OTHER PUBLICATIONS

CN-103363011-A translation, Fu Y, Oct. 2013 (Year: 2013).*
CN-202674153-U translation, Huang F, Jan. 2013 (Year: 2013).*
WO-2012152826-A1 translation, Armbrust M A, Nov. 2012 (Year: 2012).*
CN 204878518 U Translation, Li, Dec. 2015 (Year: 2015).*
CN 202381614 U Translation, Du X, Aug. 15, 2012 (Year: 2012).*
Al-Baldawi, Ammar, "Modellierung und Simulation viskoelastischer Polymerschmelzen," Dissertation, Feb. 2012, Institut für Mechanik, retrieved from the Internet at <URL:https://d-nb.info/1054309353/34> on May 20, 2022, Kassel University Press, p. 35 cited by IPEA, entire document provided, but only p. 35 is Google translated.
International Preliminary Examining Authority (IPEA), International Preliminary Report on Patentability, Chapter II, including Applicant's Dec. 22, 2021 response to the Oct. 27, 2021 Written Opinion, received for International Application No. PCT/SE2019/051326, dated Mar. 1, 2022, 13 pages, Swedish Patent and Registration Office, Sweden.
International Searching Authority, International Search Report and Written Opinion received for Application No. PCT/SE2019/051326, dated Jun. 10, 2020, 12 pages, Swedish Patent and Registration Office, Sweden.
European Patent Office, Extended European Search Report received for Application No. 19956667.0, dated Aug. 18, 2023, 8 pages, Germany.

* cited by examiner

SUSPENSION ASSEMBLY FOR SUPPORTING A VIBRATION SENSITIVE DEVICE

CROSS REFERENCE TO RELATED APPLICATIONS

This application is a National Stage Application, filed under 35 U.S.C. § 371, of International Application No. PCT/SE2019/051326, filed Dec. 19, 2019; the contents of which as are hereby incorporated by reference in their entirety.

BACKGROUND

Related Field

TECHNICAL FIELD

The present invention relates to a suspension assembly for supporting a vibration sensitive device in relation to a base. The invention further relates to a suspension system and a vehicle comprising such a suspension assembly. The invention also relates to a use of such a suspension assembly for supporting a weapon and damping vibrations during transportation.

Description of the Related Art

Vibrations are undesirable in many domains, primarily in engineered systems. Devices have thus been developed to counteract transfer of vibrations in such systems. Vibrations propagate via mechanical waves and certain mechanical structures conduct vibrations more efficiently than others. Vibration isolation and damping often make use of materials and mechanical linkages to absorb the vibration energy and to isolate such mechanical waves.

Managing vibrations for vibration sensitive devices are essential for many reasons. Neglecting or not addressing the issue of vibrations can often result in noise, damages and decreased functionality. One of the more challenging situations for vibration sensitive devices emerge during transportation. During transport by means of a vehicle, vibrations exposed to a device carried by the vehicle may originate from components inside the vehicle, such as the powertrain, as well as arise from the vehicle's movement and thus be highly influenced by the evenness of the ground over which the vehicle travels as well as other environmental issues. Vibrations may also originate from the tracks in the case of a tracked vehicle. Thus, in for example off-road transportation of cargo, such as weapons, comprising sensitive electronic components, by means of heavy duty armoured vehicles, much attention is devoted to the development of new approaches in handling shock and vibrations; since dysfunctional weapons in critical situations are highly undesirable.

One known solution for managing vibrations is disclosed in document US 2014/0061422 A1. The document discloses a shock-filtering set-point elastic supporting system for equipment suspension on board a vessel.

BRIEF SUMMARY

An object of the present invention is to achieve an advantageous suspension assembly for supporting a vibration sensitive device, which suspension assembly has improved damping characteristics and thereby reduces the risk for damages caused by vibrations.

Another object of the invention is to achieve a compact suspension assembly.

The herein mentioned objects are achieved by: a suspension assembly for supporting a vibration sensitive device in relation to a base, a suspension system for supporting an elongated vibration sensitive device in relation to a base, a vehicle comprising at least one suspension assembly, and use of a suspension assembly for supporting a weapon and damping vibrations during transportation, according to the appended independent claims.

Hence, according to an aspect of the present disclosure a suspension assembly for supporting a vibration sensitive device in relation to a base is provided. The suspension assembly comprises: a support arrangement comprising a support plate and a damping support member, the support member being configured to receive the vibration sensitive device and the support plate comprising a centre portion and at least two side portions extending with an inclination angle outwardly from the centre portion, a base arrangement comprising at least two inclined portions extending essentially in parallel with the at least two side portions of the support plate; and at least two wire rope isolators, each arranged between a side portion of the support plate and an inclined portion of the base arrangement.

According to another aspect of the present disclosure, a suspension system for supporting an elongated vibration sensitive device in relation to a base is provided.

The suspension system comprises two suspension assemblies as disclosed herein, wherein a first suspension assembly is configured to support a first end of the elongated vibration sensitive device and a second suspension assembly is configured to support a second end of the elongated vibration sensitive device.

According to another aspect of the present disclosure, a vehicle comprising a suspension assembly as disclosed herein is provided.

According to another aspect of the present disclosure, use of a suspension assembly as disclosed herein for supporting a weapon and damping vibrations during transportation is provided.

Today, adding damping material between a vibration sensitive device and a base is a widely used technique for reducing transfer of vibrations from a base to a vibration sensitive device. However, the damping properties of materials such as rubber and elastomers are often highly temperature dependent. This means that a material may have sufficient damping properties within a certain temperature interval, while having insufficient damping properties outside the interval. For example, a material such as rubber may serve as a suitable damper in a temperature range between +5 to +35° C. for certain applications. However, in the case of being exposed to higher or lower temperatures, the damping properties may all of a sudden be insufficient, which may have negative consequences.

Wire rope insulators are less temperature dependent than most isolators and dampers, and operate efficiently in a very large temperature interval. Thus, by means of the present disclosure a suspension assembly is achieved, which has effective damping properties over an increased temperature interval. The suspension assembly according to the present disclosure operates efficiently over a temperature range of at least −33° C. to +63° C.

By means of the suspension assembly according to the present disclosure, vibrations exposed to the suspension assembly are managed in multiple ways. The vibrations are counteracted through isolation, friction and absorption. Thus, the suspension assembly according to the present disclosure is configured to counteract vibrations through isolation, friction and absorption. By means of the suspension assembly, the vibration sensitive device is isolated from the source of vibrations, in order to prevent transfer of vibration energy from the source of vibrations. Furthermore, vibration energy, that despite the isolation is transferred from the source of vibrations is absorbed or changed into e.g. friction and heat in order to reduce the amount of energy. According to the present disclosure, vibration isolation and damping is primarily achieved by means of arranging wire rope isolators between inclined portions of the support plate and the base arrangement. The use of wire rope isolators are favourable due to their large deformation capability for shock absorption purposes and the effective vibration damping caused by friction, which arise when the wire rope isolators deform and relative, friction occur between adjacent wire threads. Furthermore, by arranging the wire rope isolators at an angle, favourable damping properties are not only obtained for vibrational movements in the direction of gravity for the vibration sensitive device. Due to the angular positioning of the wire rope isolators, effective isolation and damping properties are also obtained for side movements, in the form of vibrations or impacts.

In addition to the vibration isolation and damping facilitated by the wire rope isolators, isolation and damping is also provided by means of the damping support member, which absorbs vibrations and shocks. The damping properties of the damping support member is of utter most importance in the case that the wire rope isolators is bottoming, i.e. is fully compressed. In such case, the wire rope isolator may not operate as an isolator nor damper. However, the damping support member will still operate as an isolator and a damper so that sufficient damping properties is maintained at all times. Thus, a reliable suspension assembly is achieved, ensuring proper damping functionality.

By including both wire rope isolators and a damping support member in the suspension assembly, a compact and space-effective suspension assembly is achieved, while managing vibrations in a robust and reliable way. The dimensions of a comparable solution relying on only wire rope isolators would take up more space if designed to assure corresponding damping properties to the present disclosure. The same account for a solution comprising a damping support member only. Thus, by combining the different types of damping constituent parts, i.e. wire rope isolators and a damping support member, the size of each damping constituent part can be dimensioned relatively small.

According to the present disclosure, a less temperature dependent solution is achieved, which provides effective damping properties over an increased temperature interval. Since the vibrations are counteracted by multiple techniques, such as isolation; friction and absorption, and the damping is effective for movements in the direction of gravity as well as for side movements, a reliable and continuous handling of vibration energy is achieved.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognise further applications, modifications and incorporations within other fields, which are within the scope of the invention.

BRIEF DESCRIPTION OF THE FIGURES

For fuller understanding of the present invention and further objects and advantages of it, the detailed description set out below should be read together with the accompanying drawings, in which the same reference notations denote similar items in the various drawings, and in which.

DETAILED DESCRIPTION

The suspension assembly for supporting a vibration sensitive device in relation to a base will be described in further detail below. It is understood that all the various examples of the suspension assembly also applies for the suspension system and the vehicle, as well as for the use of a suspension assembly for supporting a weapon and damping vibrations during transportation.

According to an aspect of the present disclosure, a suspension assembly for supporting a vibration sensitive device in relation to a base is provided. The suspension assembly comprises: a support arrangement comprising a support plate and a damping support member, the support member being configured to receive the vibration sensitive device and the support plate comprising a centre portion and at least two side portions extending with an inclination angle outwardly from the centre portion, a base arrangement comprising at least two inclined portions extending essentially in parallel with the at least two side portions of the support plate; and at least two wire rope isolators, each arranged between a side portion of the support plate and an inclined portion of the base arrangement.

The vibration sensitive device may comprise any type of equipment sensitive for being exposed to vibrations, such as devices comprising sensitive electronics, explosives or other fragile components. According to examples, the vibration sensitive device may comprise a weapon, a camera, scientific instruments, sensors, lasers or other similar devices. The base arrangement may be configured to be attached to the base. The base may comprise any surface suitable for mounting of the base arrangement. According to examples, the base may comprise an essentially horizontal surface, a leaning surface or a rounded surface. According to an example, the base may comprise a surface associated with a vehicle.

The support arrangement may be configured to support and hold the vibration sensitive device. According to an example, the damping support member may comprise a recess configured for receiving the vibration sensitive device. The recess may be configured to at least partly accommodate the vibration sensitive device. The shape of the recess may correspond to the shape of the vibration sensitive device. Thus, the recess may act as a receiving section holding the vibration sensitive device in place. The damping support member may thus be configured to hold the vibration sensitive device in place by means of friction and by means of mating shapes of the recess and the vibration sensitive device. Due to the configuration of the suspension assembly supporting the vibration sensitive device, a user-friendly device is obtained that allows quick and easy access to the vibration sensitive device.

The damping support member may comprise resilient material. The damping support member may comprise rubber, polyurethane, polyvinyl chloride, Styrofoam, plastic foam, composites or others. Resilient material, such as e.g. rubber and plastic foam of different types, are favourable since they efficiently reduces vibrations while being cost-effective, easy to produce and mould into suitable shapes corresponding to the shape of the vibration sensitive device.

According to an example, the at least two side portions of the support plate are arranged at opposite edges of the centre portion. According to an example, the centre portion may be arranged between two side portions. The centre portion may have the shape of a convex quadrilateral, a rectangle or a square. According to an example, the support plate may be configured as an essentially rectangular element comprising an essentially rectangular centre portion and two essentially rectangular side portions arranged at opposite edges of the centre portion. According to an example, the support plate may comprise a plate-like structure with two bended edges arranged at opposite edges of the centre portion. Thus, the centre portion and the at least two side portions of the support plate may constitute a single unit, where the at least two side portions extend with an angle to the centre portion, such that a groove is formed.

According to an example, the inclination angle of the at least two side portions may also be referred to as an angle of inclination. According to an example, the inclination angle is a predetermined angle. According to an example, the inclination angle is between 90-180 degrees, or between 100-170 degrees, or between 110-160 degrees, or between 120-150 degrees or 130-140 degrees. According to an example, the inclination angle is approximately 135 degrees.

According to an example, the at least two side portions extend with an inclination angle outwardly from the centre portion and in direction away from the base when the suspension assembly is attached to the base. Thus, the at least two side portions extend with an inclination angle outwardly from the centre portion and in a direction away from the base arrangement. Alternatively, the at least two side portions extend with an inclination angle outwardly from the centre portion and towards the base. Then, the at least two side portions extend with an inclination angle outwardly from the centre portion and in a direction towards the base arrangement.

The at least two wire isolators may be connected to the support plate. Thus, the support plate may comprise attachment points for fastening the wire rope isolators to the support plate. The support plate may be arranged in association with the damping support member. The support plate may act as reinforcement of the damping support member. Thereby a rigid and robust structure is achieved which increases the lifespan of the support arrangement. The support plate may comprise metal, such as a metal sheet. The support plate may comprise steel, aluminium, titanium or other suitable metals. According to an example, the support plate may comprise reinforced plastic or a composite.

According to an example, the suspension assembly may support a vibration sensitive device in relation to a base in a military application. The military application may relate to transportation of military equipment.

The wire rope isolators may also be referred to as wire dampers. According to an example, the wire rope isolators comprise helical stranded wire rope held in place by metal retaining bars. However, according to examples the wire rope isolators may be of other suitable types; half-helical, polycal, axycal, S-shaped or others. The wire rope isolator may comprise stainless steel wire rope. The wire rope isolator may comprise other materials, such as aluminium and/or titanium. Wire rope isolators are durable and can withstand extreme environments. They are also easy to customize for the current application. The diameter of the wire rope may be selected according to the weight of the vibration sensitive device. According to an example, each wire rope isolator is mounted between opposing surfaces of a side portion of the support plate and an inclined portion of the base arrangement.

According to an example, the at least two wire rope isolators are configured as elongated wire rope isolators. Elongated wire rope isolators are beneficial due to their high inherent damping and long product lifetime with no maintenance. An elongated shape of the wire rope isolators are especially beneficial since it facilitates a compact design of the suspension assembly while enabling effective and reliable damping of vibrations. According to an example, the at least two elongated wire rope isolators are arranged in parallel to each other. According to an example, each elongated wire rope isolator extends along at least a part of a longitudinal extension of a side portion of the support plate and a longitudinal extension of an inclined portion of the base arrangement. According to an example, the at least two wire dampers are arranged symmetrically in relation to the centre portion of the support plate. According to an example, the at least two wire dampers are evenly distributed in relation to the support plate middle portion. By such configurations, a durable, efficient, reliable and evenly distributed damping is achieved.

According to an example, each elongated wire rope isolator comprises at least one coiled wire rope arranged between a lower mount plate and an upper mount plate, wherein the upper mount plate is connected to one of the at least two side portions and the lower mount plate is connected to one of the inclined portions.

According to an example, the base arrangement may comprise an intermediate portion connecting the at least two inclined portions, wherein the intermediate portion is essentially parallel with the centre portion of the support plate. According to an example, the base arrangement comprises an intermediate portion connecting the at least two inclined portions, wherein the at least two inclined portions are arranged at a selected angle relative the intermediate portion. According to an example, the at least two inclined portions are arranged at opposite edges relative the intermediate portion. According to an example, the centre portion of the support plate may be arranged essentially in parallel with the intermediate portion of the base arrangement. Since the at least two inclined portions are connected by the intermediate portion, the whole base arrangement may consist of one component, instead of multiple separate components. This configuration facilitates quick and accurate mounting of the base arrangement to a base. If the base arrangement comprises at least two separate inclined portions, the distance between the inclined portions has to be exactly determined when mounting the base arrangement in order to obtain the correct relative positioning of the inclined portions so that proper damping properties is achieved, which is time consuming. A configuration where the at least two inclined portions are connected by the intermediate portion also leads to a more rigid, robust and durable construction of the suspension assembly, which is easier to manufacture, assemble, store and transport.

The selected angle is a predetermined angle. According to an example, the selected angle is between 90-180 degrees, or between 100-170 degrees, or between 110-160 degrees, or between 120-150 degrees or 130-140 degrees. According to an example, the selected angle is approximately 135 degrees. Since the at least two inclined portions extends essentially in parallel with the at least two side portion, the selected angle essentially corresponds to the inclination angle of the at least two side portions. This means that the selected angle may be essentially equal to the inclination angle, and vice versa. However, according to examples, the selected angle may essentially correspond to the inclination angle ±10 degrees, or ±20 degrees or ±30 degrees.

According to an example, the support member comprises viscoelastic material. By means of using viscoelastic material, vibrations may be reduced, absorbed and isolated simultaneously. Thus, it efficiently absorbs shock energy and reduces vibration energy. According to an example, the support member comprises an elastomeric isolator, such as a rubber isolator. According to an example, the support member comprises PUR, i.e. polyurethane. Viscoelastic material such as rubber or PUR absorbs and reduces compressive forces. With subsequent pressure relief, the viscoelastic material return to its original form. Thus, the viscoelastic material behave physically like a damped spring. According to a specific example, PUR foam may be used. PUR foam is favourable for manufacture of durable and high-resilience components and particularly suitable for reducing vibrations where high demands are made on vibration damping. PUR foam is also light weight and easy to form by e.g. moulding.

According to an example, the support member is attached to the support plate. According to examples, the support member may be attached to the support plate by adhesive or fasteners. According to an example, the support member is at least partly arranged on the support plate on the opposite side relative the base arrangement. According to an example, the support member is at least partly arranged between the support plate and the vibration sensitive device. Thereby, transfer of vibrations to the vibration sensitive device is efficiently reduced. According to an example, the support plate is integrated with the support member. According to an example, the support member is moulded around the support plate. An integrated support plate and/or a support member moulded around the support plate, ensures that the support plate and support member is rigidly attached to each other. According to an example, the support member is moulded around the support plate by injection moulding, blow moulding or other suitable moulding process. The moulding process may comprise 3D printing technology. Moulding of the support member around the support plate reduces the risk of cracks or breakage of the support member material and reduced the risk of involuntary separation of the support member from the support plate. This leads to a robust and durable construction, which is easy to manufacture and customize to the current application. Thus, the moulding process enables tailoring of the support member to the shape of the vibrations sensitive device. Also, proper damping functionality of the suspension assembly is ensured.

According to an example, the support plate comprises apertures for allowing the support member to bond to the support plate. The apertures may thus be apertures going through the support plate from one side to the other. When the support member is moulded around the support plate, the material of the support member may during the moulding process flow into and through the apertures before solidifying. The effect of this is that the apertures form points for attachment of the support member to the support plate. Thereby, proper fastening ability is ensured between the support member and the support plate.

According to an example, the support plate may comprise first attachment points for mounting of wire ropes isolators to the support plate. The same first attachment points may also be used during moulding of the support member. During the moulding process, the first attachment points may be used for holding the support plate in the desired position within the mould, before the solidification of the support member material. Thus, the support member may be moulded around the support plate by insert moulding. Using the same first attachment points for mounting of the wire ropes isolators and holding of the support plate within the mould, simplifies the manufacturing process and saves time and costs.

According to an example, the side portions may comprise the first attachment points for mounting of wire ropes isolators to the support plate. According to an example, the inclined portions may comprise second attachment points for mounting of wire ropes isolators to the base arrangement.

According to an example, the suspension assembly comprises a bump stop. According to an example, the bump stop is arranged between the base arrangement and the centre portion of the support plate. According to an example, the bump stop may comprise resilient material, such as rubber. According to another example, the bump stop may comprise an elongated element. The elongated member may comprise a metal rod. According to an example, the bump stop is arranged to extend through an opening in the centre portion of the support plate. According to an example, the bump stop may be arranged at the intermediate portion. According to an example, the bump stop may extend from the intermediate portion towards the support plate. According to an example, the bump stop protrudes essentially perpendicularly from the intermediate portion towards the support arrangement. According to an example, the support member may comprise a cavity for at least partially receiving/accommodating the bump stop. The bump stop may protect the wire rope isolators from bottoming out. Bottoming out is a situation which may occur when the wire rope isolators are heavily compressed, which may occur at heavy loads and/or high impacts. Thus, in such high impact situations the wire rope isolators may be so compressed that the bump stop will carry the load, instead of the wire rope isolators. Thus, the bump stop reduces the risk of the wire rope isolators being damaged. In addition, the suspension assembly still provides proper damping functionality when the wire rope isolators is bottoming out, since the bumps stop will encounter the damping support member providing damping effect. Thus, the bump stop protects the wire rope isolators while simultaneously assisting in the reduction of vibrations by means of co-acting with the support member.

According to an example, the base arrangement may comprise mounting holes for mounting of the base arrangement to the base. According to an example, the support arrangement may comprise channels extending through the support member and the support plate. The channels allow for access for mounting of the suspension assembly to the base. Thus, the channels may be arranged to be aligned with the mounting holes. The channels may extend essentially in a perpendicular direction relative a surface of the centre portion. A tool, such as a screwdriver, hex key or other type of hand tool, may be thus be inserted into the channels in order to enable mounting of the base arrangement to the base. This is beneficial when the space between the support arrangement and base arrangement is limited and it is difficult to manoeuvre a tool for mounting between the support arrangement and the base arrangement.

According to an example, the vibration sensitive device to be supported by the suspension assembly comprises a weapon. Weapon may comprise sensitive electronics for controlled systems and explosives, and efficient damping is thus of major importance. According to an example, the weapon is a handheld combat weapon, such as a missile. The suspension assembly may be configured for supporting a weapon that may be carried by one person. According to an example, the weapon may have a weight of approximately 10-15 kg. In use, the weapon may be operated by 1-3 operators.

According to an example, the suspension assembly comprises a fastening element with a quick-release mechanism for retaining the vibration sensitive device in the suspension assembly. According to an example, the suspension assembly comprises a bracket with a latch for retaining the vibration sensitive device in the suspension assembly. According to an example, the suspension assembly comprises at least one strap with a quick-coupling for retaining the vibration sensitive device in the suspension assembly. By means of the fastening element, bracket or strap, the vibration sensitive device may securely be held in place. By means of the quick-release mechanism, latch or quick-coupling, the vibration sensitive device may be mounted and demounted from the suspension assembly a lot faster and with less effort, compared to more rigid fixtures demanding tools for attaching or removal. Quick removal may in certain applications may be invaluable, such as quick removal of a weapon when being under attack.

According to an example, the base is configured to be arranged on a vehicle. According to an example, the base is a vehicle. According to an example, the vehicle may be driven by wheels and/or tracks. The vehicle may comprise an armoured combat vehicle. According to examples, the vehicle may comprise an amphibious vehicle or an aircraft, such as a helicopter. According to an example, the vehicle may comprise a vessel or ship. The vehicle may be manually operated, remotely operated or autonomously operated. According to an example, the base may be arranged internally or externally on the vehicle. Thus, the suspension arrangement may be arranged on the outside of a vehicle, e.g. at a roof or a flatbed of a truck.

Alternatively, the suspension arrangement may be arranged inside the vehicle, e in a trunk or storage compartment.

According to an aspect, a suspension system for supporting an elongated vibration sensitive device in relation to a base is provided. The suspension system comprises two suspension assemblies as disclosed herein, wherein a first suspension assembly is configured to support a first end of the elongated vibration sensitive device and a second suspension assembly is configured to support a second end of the elongated vibration sensitive device. The elongated vibration sensitive device may have a length of between 0.5-3 meters, or 1-2 meters, or approximately 1.5 meters. By supporting the elongated vibration sensitive device in each end, an efficient and stabile reduction of vibration transfer to the vibration sensitive device is achieved.

The first suspension assembly supporting the first end and the second suspension assembly supporting the second end of the elongated vibration sensitive device may be configured essentially in the same manner. However, since the elongated vibration sensitive device may not be configured exactly the same way at both ends, each of the first and second suspension assembly may be customized to fit the vibration sensitive device. Thus, the first and second suspension assembly may differ from each other if it is beneficial.

According to an aspect, a vehicle comprising at least one suspension assembly as disclosed herein is provided.

According to an aspect, use of a suspension assembly as disclosed herein is provided for supporting a weapon and damping vibrations during transportation.

The present disclosure will now be further illustrated with reference to the appended figures, wherein for the sake of clarity and understanding of the disclosure some details of no importance are deleted from the figures. Moreover, the figures shall not be considered drawn to scale as some features may be exaggerated in order to more clearly illustrate the invention.

Figure 1:
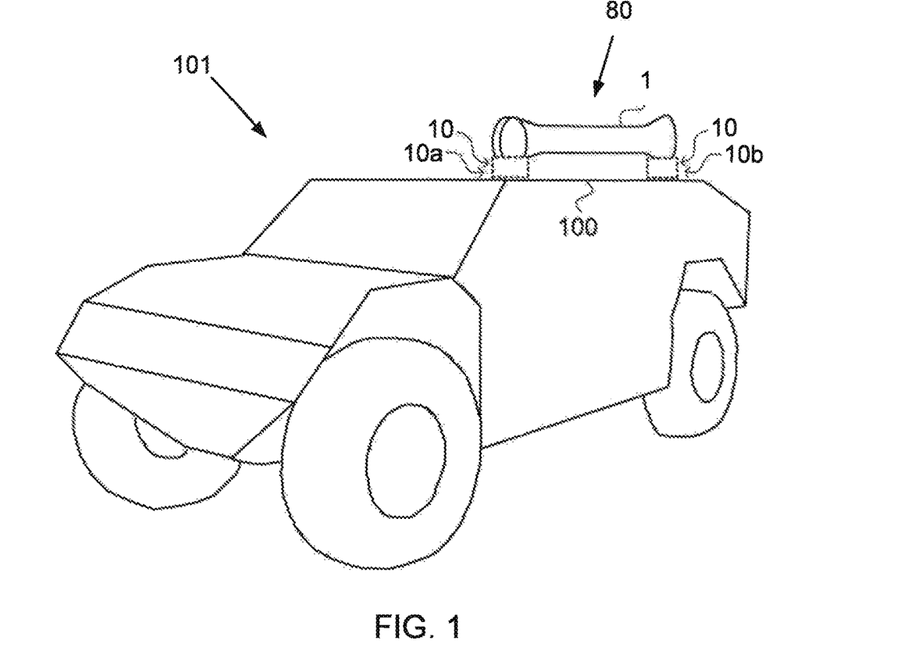
FIG. 1 schematically illustrates a vehicle according to an example.

FIG. 1 schematically shows a perspective view of a vehicle 101. The vehicle 101 comprises at least one suspension assembly 10, 10*a*, 10*b*. The at least one suspension assembly 10, 10*a*, 10*b* support a vibration sensitive device 1 in relation to a base 100. The suspension assembly 10, 10*a*, 10*b* is further described in FIGS. 2, 3, 4, 5, 6*a*-6*d*, 7*a*-7*c*, 8 and 9*a*-9*d*.

A suspension system 80 for supporting the elongated vibration sensitive device 1 in relation to the base 100 is also schematically illustrates in FIG. 1. The suspension system 80 comprises two suspension assemblies 10, 10*a*, 10*b*. A first suspension assembly 10, 10*a* is configured to support a first end of an elongated vibration sensitive device 1 and a second suspension assembly 10, 10*b* is configured to support a second end of the elongated vibration sensitive device 1. The suspension system 80 is further described in FIGS. 9*a*-9*d*.

The vehicle 101 may be driven by wheels, as shown in FIG. 1. Alternatively, the vehicle 101 may be driven by tracks. The vehicle 101 may be manually operated, remotely operated or autonomously operated. The vehicle 101 may comprise the base 100. Thus, the base 100 may be a part of the vehicle 101. The base 100 may be arranged inside or outside the vehicle 101. Thus, the suspension assembly 10, 10*a*, 10*b* may be arranged on the outside of the vehicle 101 as schematically disclosed in FIG. 1. In FIG. 1, the vehicle 101 is illustrated as an armoured combat vehicle comprising two suspension assemblies 10, 10*a*, 10*b* arranged at the roof. Alternatively, the suspension assemblies 10, 10*a*, 10*b* may be arranged inside the vehicle 101, e.g. in a trunk or storage compartment.

The vibration sensitive device 1 to be supported by the suspension assembly 10, 10*a*, 10*b* may comprises a weapon. Alternatively, the vibration sensitive device 1 may comprise a camera, scientific instruments, sensors, lasers or other similar devices. FIG. 1 schematically illustrates the use of a suspension assembly 10, 10*a*, 10*b* for supporting a weapon and damping vibrations during transportation. The vibration sensitive device 1 is in FIG. 1 illustrated as a handheld combat weapon, such as a missile.

Figure 2:
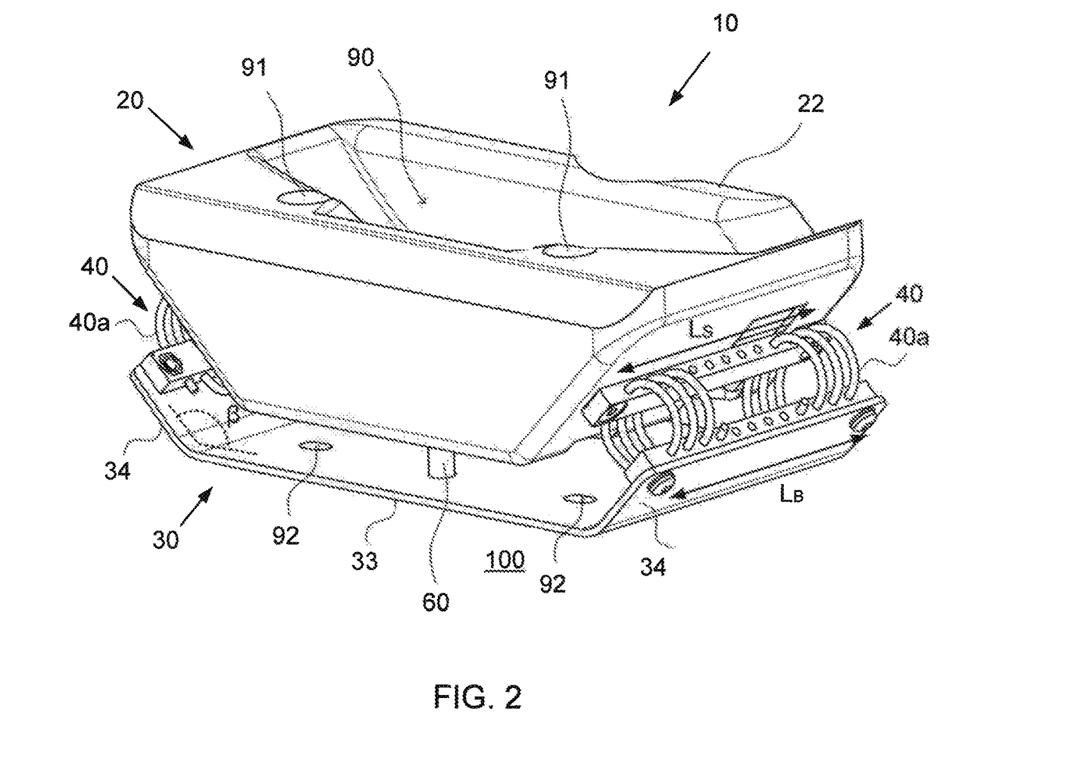
FIG. 2 schematically illustrates a suspension assembly according to an example.

FIG. 2 schematically illustrates a perspective view of a suspension assembly 10 for supporting a vibration sensitive device 1 in relation to a base 100 according to an example. The suspension assembly 10 comprises: a support arrangement 20, a base arrangement 30 and at least two wire rope isolators 40. The at least two wire rope isolators 40 are configured as elongated wire rope isolators 40, 40*a*. The support arrangement 20 support and hold the vibration sensitive device 1 in use. The base arrangement 30 may be configured to be attached to the base 100.

Figure 3:
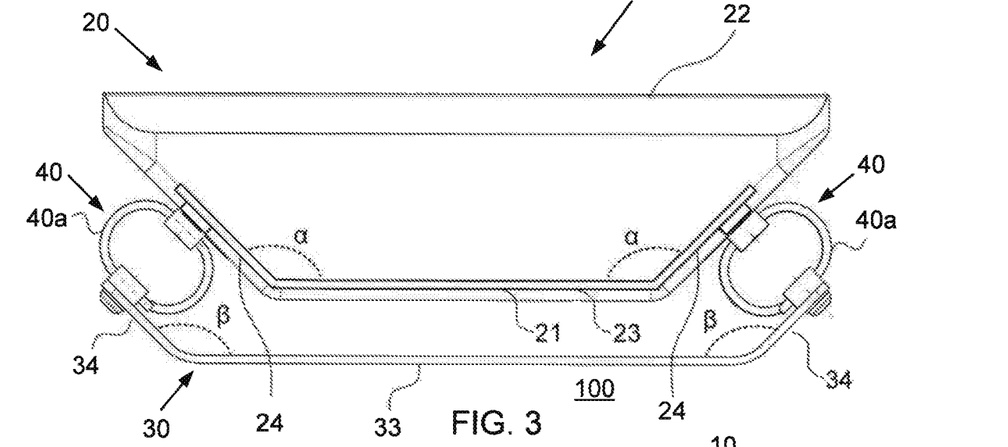
FIG. 3 schematically illustrates a suspension assembly according to an example.
Figure 4:
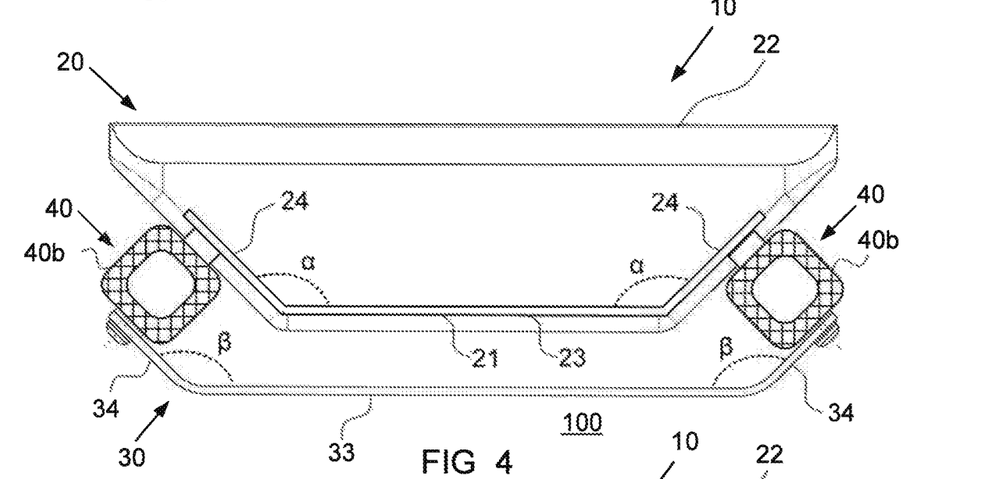
FIG. 4 schematically illustrates a suspension assembly according to an example.
Figure 5:
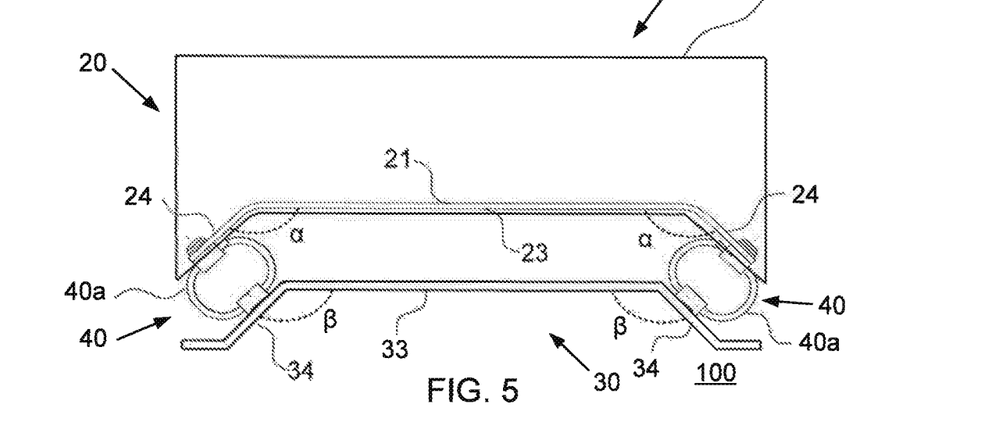
FIG. 5 schematically illustrates a suspension assembly according to an example.
Figure 6A:
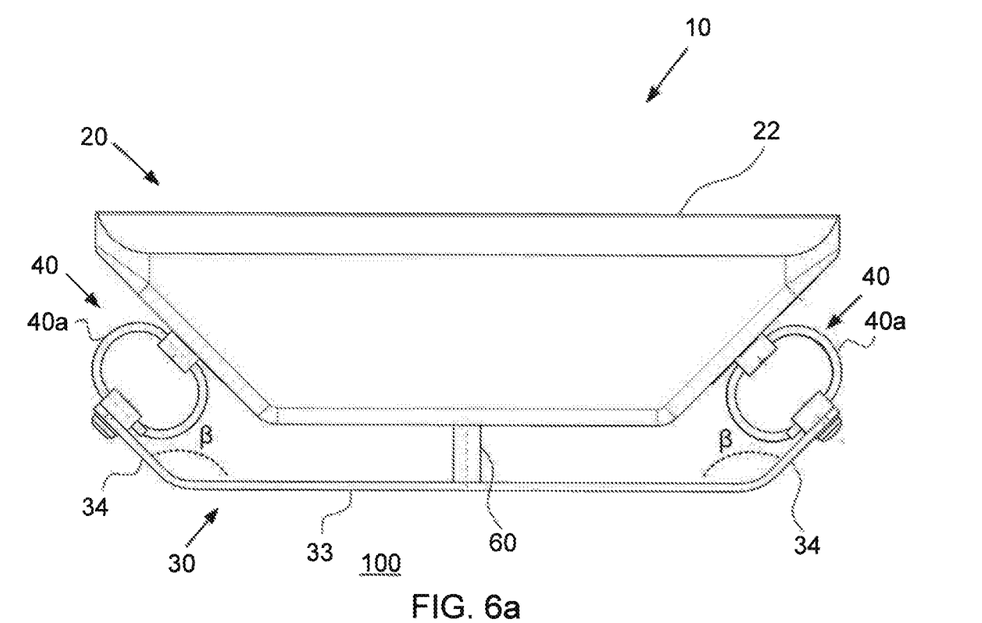
FIGS. 6a-6d schematically illustrate details of a suspension assembly according to an example.
Figure 6B:
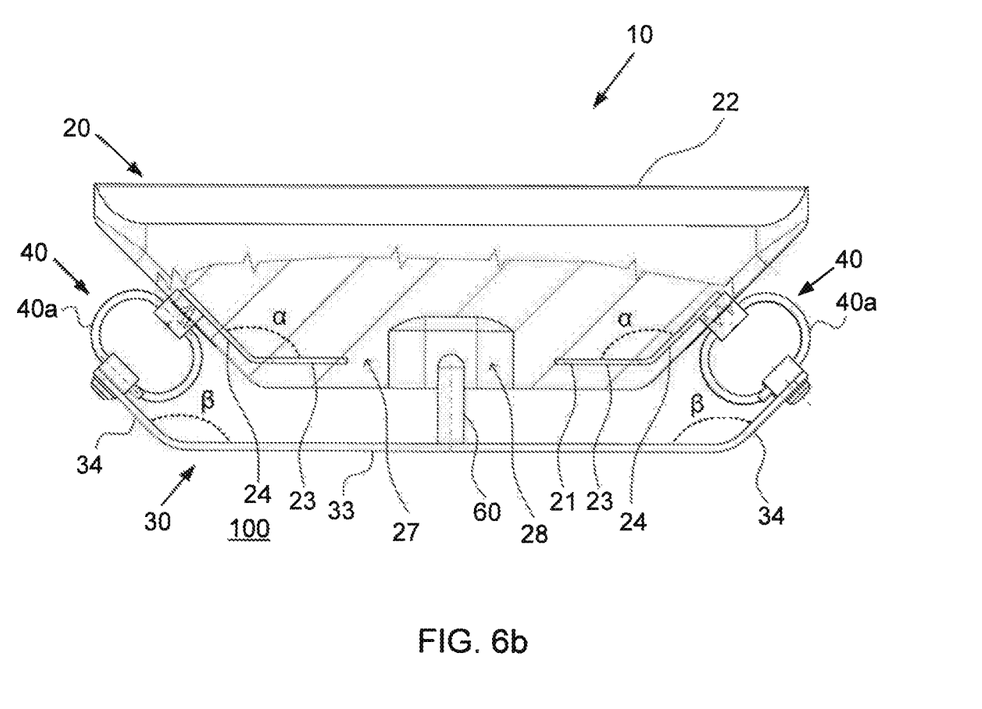
Figure 6C:
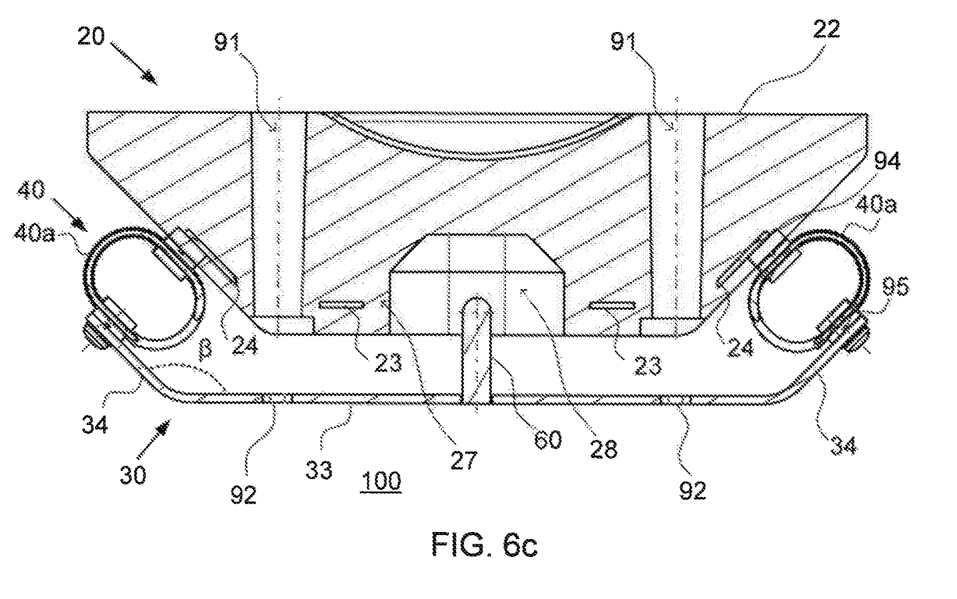
Figure 6D:
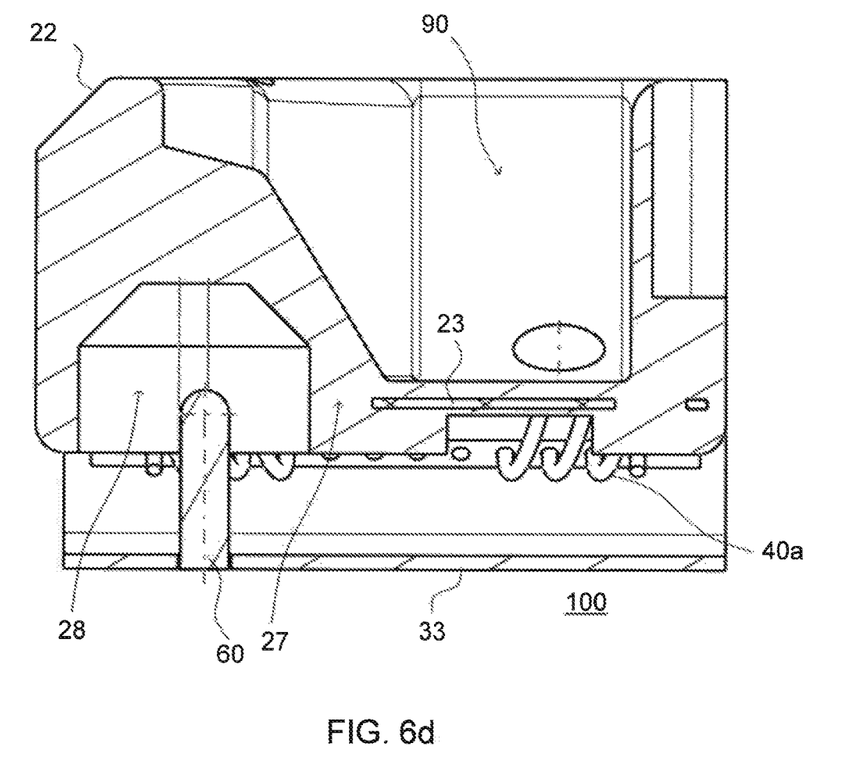

The suspension assembly 10 will now be described in further detail with references to FIGS. 3-5. FIGS. 3-5 schematically illustrate cross sectional side views of a suspension assembly 10 according to examples. The suspension assembly 10 comprises: a support arrangement 20, a base arrangement 30 and at least two wire rope isolators 40. The support arrangement 20 comprises a support plate 21 and a damping support member 22. The support member 22 is configured to receive the vibration sensitive device 1 and the support plate 21 comprises a centre portion 23 and at least two side portions 24 extending with an inclination angle α outwardly from the centre portion 23. The base arrangement 30 comprises at least two inclined portions 34 extending essentially in parallel with the at least two side portions 24 of the support plate 21. The at least two wire rope isolators 40 are each arranged between a side portion 24 of the support plate 21 and an inclined portion 34 of the base arrangement 30.

In FIGS. 3 and 4, the at least two side portions 24 extend with an inclination angle α outwardly from the centre portion 23 and away from the base 100. Thus, the at least two side portions 24 extend with an inclination angle α outwardly from the centre portion 23 and in a direction away from the base arrangement 30. In FIG. 5, the at least two side portions 24 extend with an inclination angle α outwardly from the centre portion 23 and towards the base 100. Thus, the at least two side portions 24 extend with an inclination angle α outwardly from the centre portion 23 and in a direction towards the base arrangement 30.

According to examples, the inclination angle α is between 90-180 degrees, or between 100-170 degrees, or between 110-160 degrees, or between 120-150 degrees or 130-140 degrees. In FIGS. 3-5, the inclination angle α is schematically illustrated as approximately 135 degrees.

The at least two wire rope isolators 40 may be configured as elongated wire rope isolators 40, 40a, which is schematically illustrated in FIGS. 2 and 3. Each elongated wire rope isolator 40, 40a may extend along at least a part of a longitudinal extension $L_S$ of a side portion 24 of the support plate 21 and a longitudinal extension $L_B$ of an inclined portion 34 of the base arrangement 30 as shown in FIG. 2. The at least two wire rope isolators 40 may be arranged symmetrically in relation to the centre portion 23 of the support plate 21.

According to an example, the base arrangement 30 may comprise an intermediate portion 33 connecting the at least two inclined portions 34, wherein the at least two inclined portions 34 are arranged at a selected angle β relative the intermediate portion 33. Since the at least two inclined portions 34 extends essentially in parallel with the at least two side portion 24, the selected angle β essentially corresponds to the inclination angle α. According to an example, the base arrangement 30 may comprise an intermediate portion 33 connecting the at least two inclined portions 34, wherein the intermediate portion 33 is essentially parallel with the centre portion 23 of the support plate 21.

The support member 22 may comprise viscoelastic material. The support plate 21 may be integrated with the support member 22. The support member 22 may be moulded around the support plate 21. The damping support member 22 may comprise a recess 90 for the vibration sensitive device 1, as shown in FIG. 2. The recess 90 may at least partly accommodate the vibration sensitive device 1. The shape of the recess 90 may correspond to the shape of the vibration sensitive device 1.

In FIG. 4, the wire rope isolators 40, 40b is schematically illustrated as wire rope isolators of other types than elongated wire rope isolators. The wire rope isolators may be of any suitable type; helical, half-helical, polycal, axycal, S-shaped or others.

FIGS. 6a-6d schematically illustrate cross sectional side views of a suspension assembly 10 according to an example. The suspension assembly 10 as shown in FIGS. 6a-6d may be configured as disclosed in FIG. 2. The suspension assembly 10 may comprise a bump stop 60. The bump stop 60 may be arranged between the base arrangement 30 and the centre portion 23 of the support plate 21. The bump stop 60 may be arranged to extend through an opening 27 in the centre portion 23 of the support plate 21. The support member may comprise a cavity 28 for at least partially accommodating the bump stop 60.

The support plate may comprise first attachment points 94 for mounting of wire ropes isolators 40 to the support plate 21. The same first attachment points 94 may also be used during moulding of the support member 22. The inclined portions 34 may comprise second attachment points 95 for mounting of wire ropes isolators 40 to the base arrangement 30.

The base arrangement 30 may comprise mounting holes 92 for mounting of the base arrangement to the base 100. The support arrangement may further comprise channels 91 extending through the support member 22 and the support plate 21. The channels 91 allow for access for mounting of the suspension assembly 10 to the base 100. Thus, the channels 91 may be arranged to be aligned with the mounting holes 92. The channels 91 may extend essentially in a perpendicular direction relative a surface of the centre portion 23.

Figure 7A:
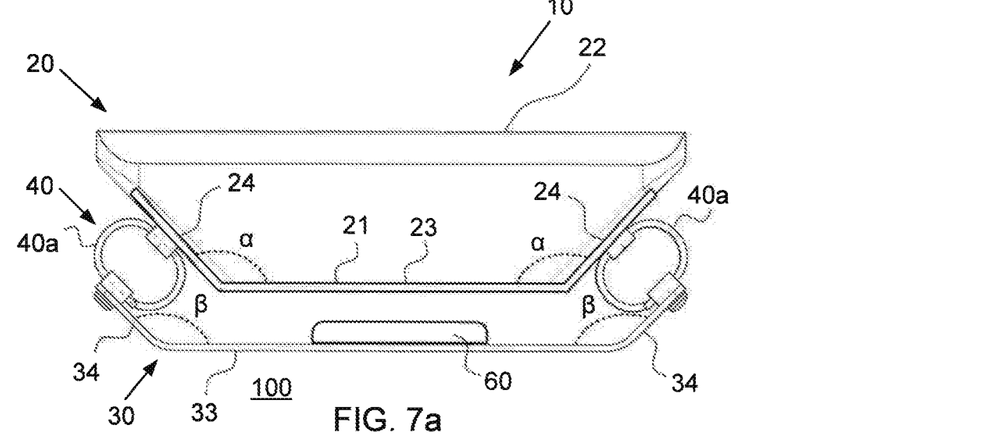
FIGS. 7a-7c schematically illustrate a suspension assembly according to examples.
Figure 7B:
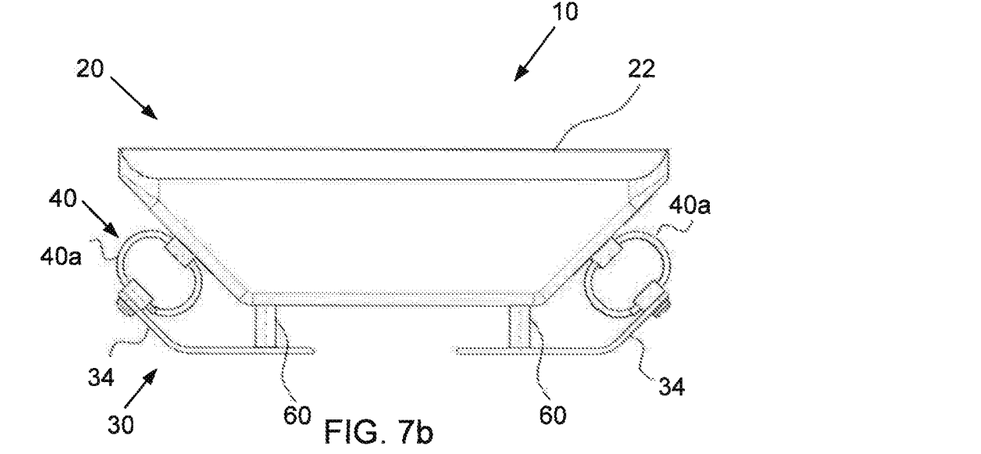
Figure 7C:
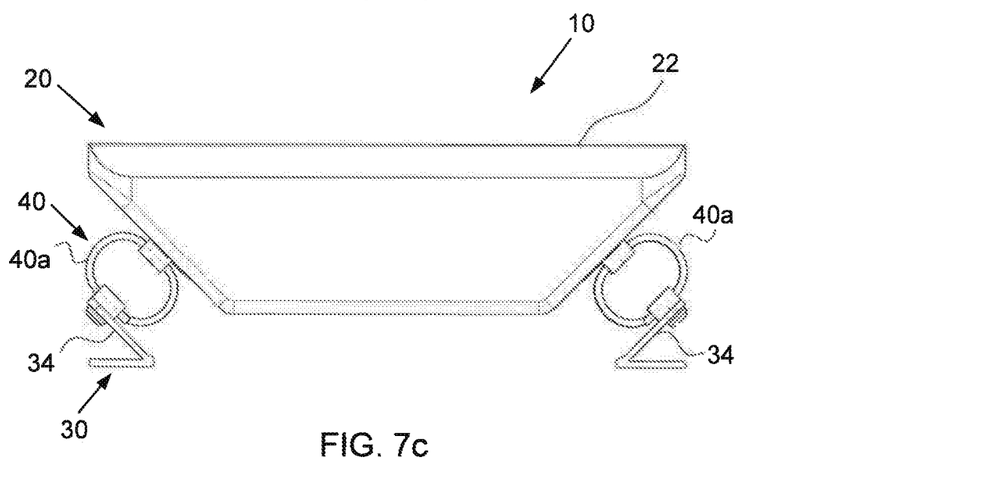

FIGS. 7a-7c schematically illustrate a side view of a suspension assembly 10 according to examples of the present disclosure. As illustrated in FIG. 7a, the suspension assembly 10 may comprise a bump stop 60. The bump stop 60 may be arranged between the base arrangement 30 and the centre portion 23 of the support plate 21. The bump stop 60 may comprise a resilient material such as rubber. The bump stop 60 in FIG. 7a is illustrated as a rubber cushion. In FIG. 7a, the support member 22 is not moulded around the support plate 21. However, the support plate 21 is integrated with the support member 22. For example, the support member 22 may be attached to the support plate 21 by adhesive or fasteners. As illustrated in FIGS. 7b and 7c, the base arrangement 30 may not comprises an intermediate portion 33 connecting the at least two inclined portions 34. As illustrated in FIG. 7b, the suspension assembly 10 may comprise two bump stops 60.

Figure 8:
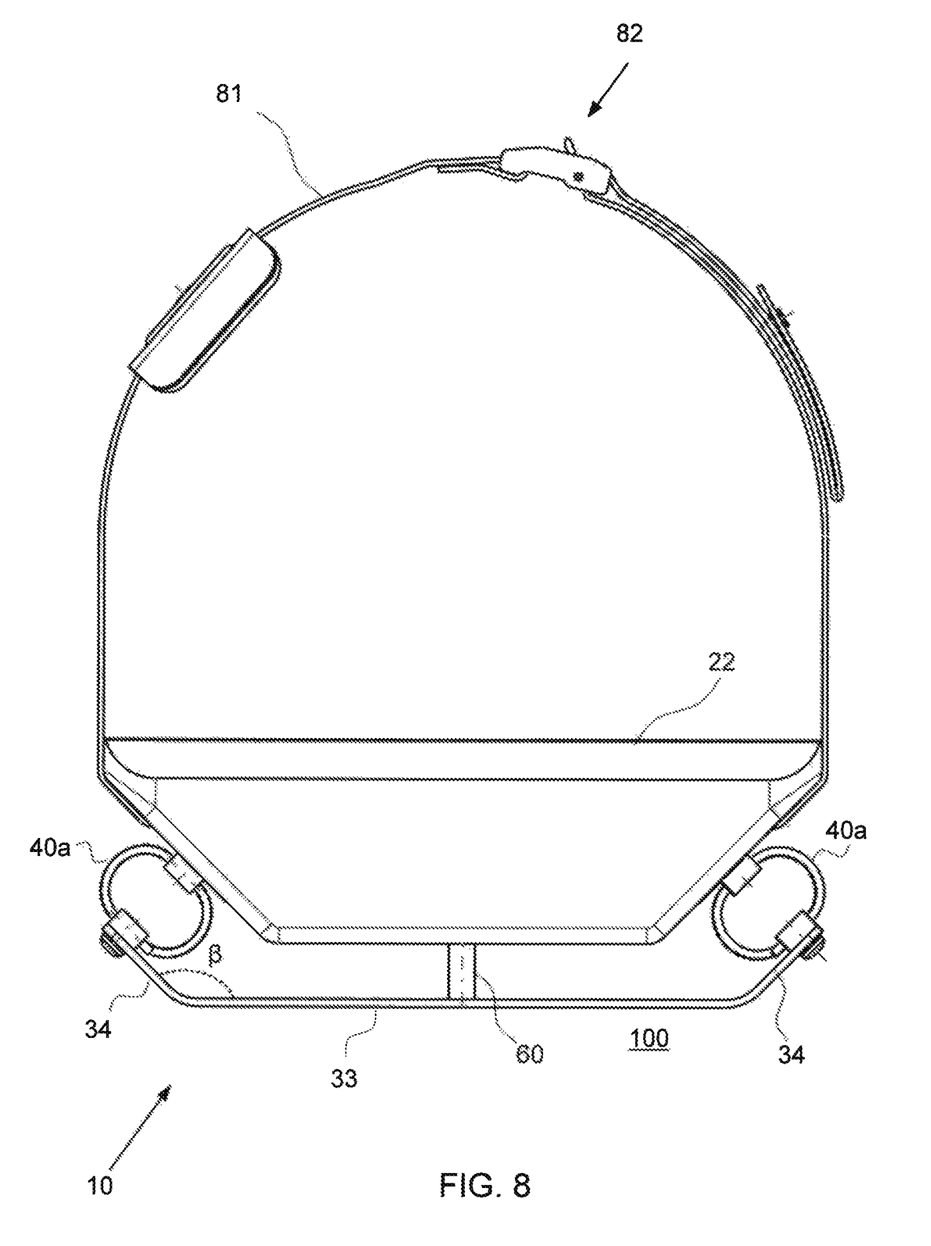
FIG. 8 schematically illustrates a suspension assembly according to an example.

FIG. 8 schematically illustrate a side view of a suspension assembly 10 according to an example. The suspension assembly 10 in FIG. 8 may comprise the corresponding features as previously described in relation to FIGS. 2 and 6a-6d. The suspension assembly 10 may comprise at least one strap 81 with a quick-coupling 82 for retaining the vibration sensitive device 1 in the suspension assembly 10.

Figure 9A:
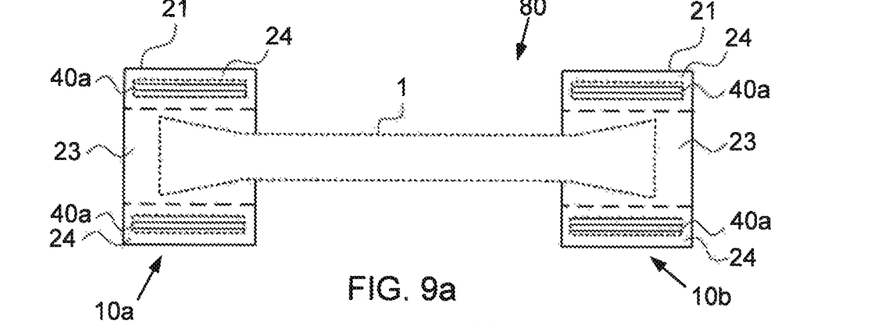
FIGS. 9a-9d schematically illustrate a suspension system according to examples.
Figure 9B:
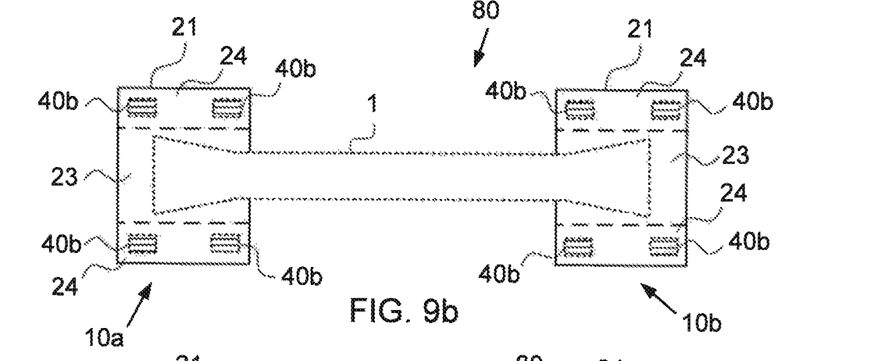
Figure 9C:
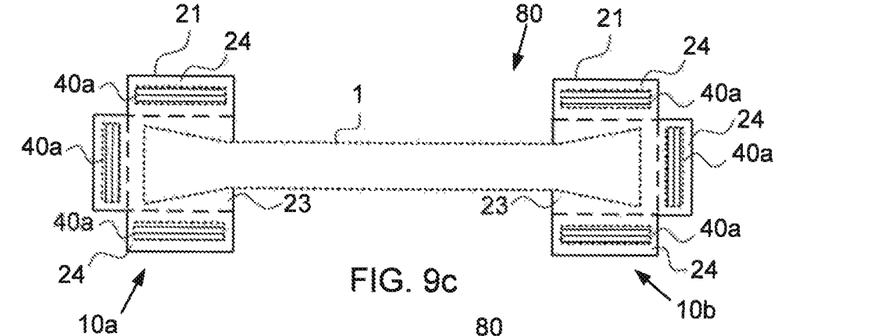
Figure 9D:
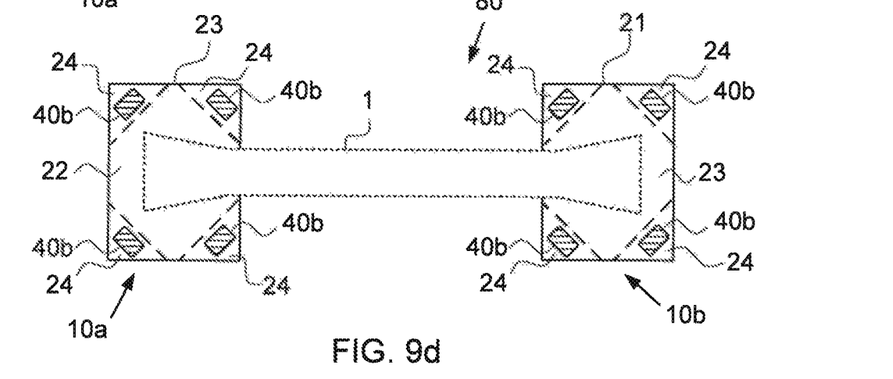

FIGS. 9a-9d schematically illustrate a top view of the suspension system 80 for supporting an elongated vibration sensitive device 1 in relation to a base 100 according to examples of the present disclosure. In FIG. 9a-9b, the suspension system 80 comprises two suspension assemblies 10, 10a, 10b. A first suspension assembly 10, 10a is configured to support a first end of the elongated vibration sensitive device 1 and a second suspension assembly 10, 10b is configured to support a second end of the elongated vibration sensitive device 1. In FIG. 9a, each suspension assembly 10, 10a, 10b comprises two elongated wire rope isolators 40a arranged on opposite sides of the centre portion 22. In FIG. 9b, each suspension assembly 10, 10a, 10b comprises four wire rope isolators 40b, wherein the four wire rope isolators 40b are arranged symmetrically in relation to the centre portion 23 of the support plate 21. In FIG. 9c, each suspension assembly 10, 10a, 10b comprises three elongated wire rope isolators 40a arranged on three edges of the support plate 21. In FIG. 9d, each suspension assembly 10, 10a, 10b comprises four wire rope isolators 40b arranged at each corner of the support plate 21.

The foregoing description of the preferred examples of the present disclosure is provided for illustrative and descriptive purposes. It is not intended to be exhaustive or to restrict the invention to the variants described. Many modifications and variations will obviously be apparent to one skilled in the art. The examples of the present disclosure have been chosen and described in order best to explain the principles of the invention and its practical applications and hence make it possible for specialists to understand the invention for various embodiments and with the various modifications appropriate to the intended use.

The invention claimed is:

1. A weapon suspension assembly (10, 10a, 10b) for supporting a vibration sensitive device (1) in relation to a base (100) during transportation thereof, the weapon suspension assembly (10, 10a, 10b) comprising:
    a support arrangement (20) comprising a support plate (21) integrated with a damping support member (22), the damping support member (22) being configured to receive the vibration sensitive device (1) and the support plate (21) comprising a centre portion (23) and at least two side portions (24) extending with an inclination angle (a) outwardly from the centre portion (23);
    a base arrangement (30) comprising at least two inclined portions (34) extending essentially in parallel with the at least two side portions (24) of the support plate (21); and
    at least two wire rope isolators (40), each arranged between a side portion (24) of the support plate (21) and an inclined portion (34) of the base arrangement (30),
    wherein:
        the weapon suspension assembly (10, 10a, 10b) is configured to be arranged on or inside a vehicle during the transportation thereof,
        the damping support member (22) comprises viscoelastic material and a recess for receiving the vibration sensitive device, and
        the support plate (21) is integrated within the damping support member (22) such that the support plate (21) acts as reinforcement of the surrounding damping support member (22).

2. The weapon suspension assembly (10, 10a, 10b) according to claim 1, wherein the at least two wire rope isolators (40) are configured as elongated wire rope isolators (40, 40a).

3. The weapon suspension assembly (10, 10a, 10b) according to claim 2, wherein each elongated wire rope isolator (40, 40a) extends along at least a part of a longitudinal extension (Ls) of a side portion (24) of the support plate (21) and a longitudinal extension ($L_B$) of an inclined portion (34) of the base arrangement (30).

4. The weapon suspension assembly (10, 10a, 10b) according to claim 1, wherein the at least two wire rope isolators (40) are arranged symmetrically in relation to the centre portion (23) of the support plate (21).

5. The weapon suspension assembly (10, 10a, 10b) according to claim 1, wherein the base arrangement (30) comprises an intermediate portion (33) connecting the at least two inclined portions (34), wherein the intermediate portion (33) is essentially parallel with the centre portion (23) of the support plate (21).

6. The weapon suspension assembly (10, 10a, 10b) according to claim 1, wherein the support member (22) is moulded around the support plate (21).

7. The suspension assembly (10, 10a, 10b) according to claim 1, wherein the suspension assembly (10, 10a, 10b) comprises a bump stop (60).

8. The suspension assembly (10, 10a, 10b) according to claim 7, wherein the bump stop (60) is arranged between the base arrangement (30) and the centre portion (23) of the support plate (21).

9. The weapon suspension assembly (10, 10a, 10b) according to claim 8, wherein the bump stop (60) is arranged to extend through an opening (27) in the centre portion (23) of the support plate (21).

10. The weapon suspension assembly (10, 10a, 10b) according to claim 1, further comprising at least one strap (81) with a quick-coupling (82) for retaining the vibration sensitive device (1) in the weapon suspension assembly (10, 10a, 10b).

11. A suspension system (80) for supporting an elongated vibration sensitive device (1) in relation to a base (100) during transportation thereof, wherein the suspension system (80) comprises two weapon suspension assemblies (10, 10a, 10b) according to claim 1, and wherein a first weapon suspension assembly (10, 10a) of the two weapon suspension assemblies is configured to support a first end of the elongated vibration sensitive device (1) and a second weapon suspension assembly (10, 10b) of the two weapon suspension assemblies is configured to support a second end of the elongated vibration sensitive device (1).

12. A vehicle (110) comprising at least one weapon suspension assembly (10, 10a, 10b) according to claim 1.

13. Use of a weapon suspension assembly (10, 10a, 10b) according to claim 1 for supporting a weapon and for damping vibrations during transportation.

* * * * *

UNITED STATES PATENT AND TRADEMARK OFFICE
CERTIFICATE OF CORRECTION

PATENT NO. : 12,172,569 B2
APPLICATION NO. : 17/756389
DATED : December 24, 2024
INVENTOR(S) : Jonas Björnsson et al.

Page 1 of 1

It is certified that error appears in the above-identified patent and that said Letters Patent is hereby corrected as shown below:

In the Claims

In Column 13, Line 32, Claim 1, delete "(a)" and insert -- ($\alpha$) --, therefor.
In Column 13, Line 47, Claim 1, delete "sensitive device," and insert -- sensitive device (1), --, therefor.
In Column 14, Line 4, Claim 3, delete "(Ls)" and insert -- ($L_s$) --, therefor.
In Column 14, Line 21, Claim 7, delete "suspension" and insert -- weapon suspension --, therefor.
In Column 14, Line 24, Claim 8, delete "suspension" and insert -- weapon suspension --, therefor.

Signed and Sealed this
Sixth Day of May, 2025

Coke Morgan Stewart
*Acting Director of the United States Patent and Trademark Office*